No. 626,801. Patented June 13, 1899.
S. WYATT.
VEHICLE ATTACHMENT AND HOLDING DEVICE.
(Application filed Feb. 14, 1899.)
(No Model.)
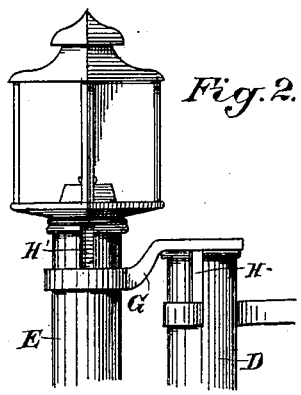
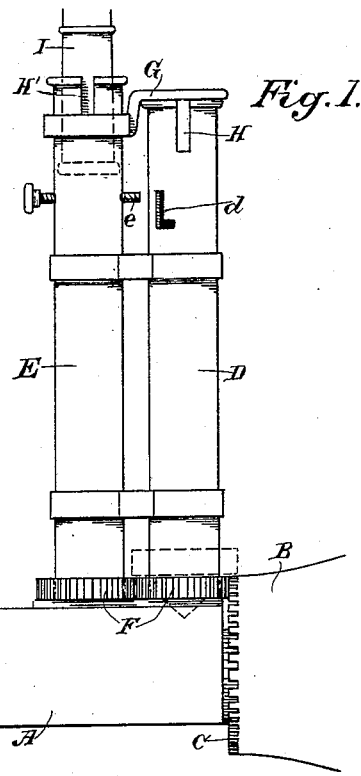
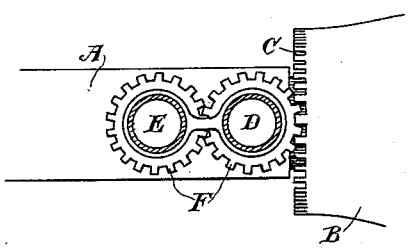
Witnesses,
Inventor,
Samuel Wyatt
By Dewey Strong & Co.
Attys
THE NORRIS PETERS CO., PHOTO-LITHO., WASHINGTON, D. C.

UNITED STATES PATENT OFFICE.

SAMUEL WYATT, OF SAN FRANCISCO, CALIFORNIA.

VEHICLE ATTACHMENT AND HOLDING DEVICE.

SPECIFICATION forming part of Letters Patent No. 626,801, dated June 13, 1899.

Application filed February 14, 1899. Serial No. 705,481. (No model.)

*To all whom it may concern:*

Be it known that I, SAMUEL WYATT, a citizen of the United States, residing in the city and county of San Francisco, State of California, have invented an Improvement in Vehicle Attachments and Holding Devices; and I hereby declare the following to be a full, clear, and exact description of the same.

My invention relates to an attachment for vehicles which is especially designed for the purpose of holding the team when they are to be left and also as a convenient attachment for the reins in any case, and it may also be employed for the support of a lantern to be used at night.

It consists, essentially, in vertical standards supported from the axle and which may be turnable by means of intermeshing gears and a driving-gear fixed to the wheel or hub, by which motion is transmitted thereto.

Both the vertical shafts are slotted to receive the reins, and one is movable to disengage it from the wheel-driving device, so that when desired it may remain stationary. When the gears are engaged, it revolves, and if the horse or team should start when the reins are attached the latter will be wound up and exert a pull which will stop the team.

Referring to the accompanying drawings, Figure 1 is a vertical elevation showing the part of the wheel and axle and the attachment. Fig. 2 shows the standards with a lamp and rein attached to them. Fig. 3 is a plan view showing the intermeshing gears.

A represents the axle of any vehicle or any other stationary part to which it may be convenient to attach my device.

B is the hub of a wheel turnable upon the axle and having a gearing C fixed to its inner periphery.

D and E are vertical standards supported from the axle or other stationary part, as shown, and having the gears F upon the lower ends, which intermesh with each other. One of these gears also engages the gear C upon the wheel-hub, and through this motion is transmitted to rotate the standard D.

When the device is to be thrown out of operation, it is done by raising the standard D, which has made in it a right-angled slot $d$. A pin $e$ projects from the side of the standard E and its end enters the slot $d$. The vertical portion of the slot $d$ is long enough to allow the standard D to be raised, sliding upon the pin $e$ until the gear upon the lower end has been disengaged from the gear C of the wheel. The standard D is then turned so that the pin enters the transverse portion of the slot $d$, and it thus holds the standard D up, with its gear F out of engagement with the gear C of the wheel. In this condition both standards will remain stationary. When the standard D has been lowered to bring the gears into engagement, it may be held down, if desired, by a stop G, swiveled upon the standard E and turnable so as to extend above the end of the standard D, thus preventing it from rising. In the upper end of each of these standards are made slots, as shown at H H', and these are adapted to receive the bight of the reins, which can be hooked into either of these slots at will.

For an ordinary stop, when the standard D is raised and the gears disengaged, the reins may be dropped into the slot H' of the standard E; but where the team is to be left the standard D will be lowered until the gears are in engagement and the reins engaged with the slot H in its upper end, after which the stop G may be turned above the upper end to prevent the reins from pulling out. When arranged in this manner, any movement of the team will cause the shaft D to turn and will wind the reins up on it whether the team move forward or backward, and in any case a pull will be exerted which will tend to stop their movement.

When not in use for other purposes, the upper end of the standard E may be used as a socket for a whip I, which will be in convenient position for use by the driver, or for an alarm-bell. Either of the sockets at the top of the standards D or E may also be employed to support a lantern which has a shank suitable to fit the sockets, and if the shafts are revoluble the light may be displayed alternately through different-colored glasses of which the sides may be formed, or advertising matter may be imprinted upon the glass, if desired.

By gearing the device so as to rotate one of the shafts at a sufficient rate of speed it could be made to drive a small dynamo and sufficient to furnish an electric current for an incandescent light in place of other kinds.

Having thus described my invention, what I claim as new, and desire to secure by Letters Patent, is—

1. A vehicle attachment consisting of vertical standards having slots in the upper end for the attachment of reins, and means comprising intermeshing gears upon the standards and the wheel-hub whereby the shafts may be rotated by the movement of the vehicle.

2. A vehicle attachment consisting of standards, gears upon said standards intermeshing with a corresponding gear upon the vehicle-hub, a means for disengaging the gears, consisting of a right-angled slot made in one of the standards, a pin projecting from the other into said slot whereby the standard may be raised to disengage its gear from the wheel-hub and turned so that the pin will retain it in its raised position.

3. A vehicle attachment consisting of standards having engaging gearing one of which is adapted to be rotated by contact with the wheel-hub, said standards having sockets in their upper ends adapted to receive a lantern or other appurtenance of the vehicle.

In witness whereof I have hereunto set my hand.

SAMUEL WYATT.

Witnesses:
S. H. NOURSE,
JESSIE C. BRODIE.